United States Patent
Kirmani et al.

(10) Patent No.: US 12,460,323 B2
(45) Date of Patent: Nov. 4, 2025

(54) CONTINUOUS AND DISCONTINUOUS FIBERS, YARN, FABRICS AND COMPOSITES USING SHORT NATURAL FIBERS AND FIBRILS

(71) Applicant: GM GLOBAL TECHNOLOGY OPERATIONS LLC, Detroit, MI (US)

(72) Inventors: Mohammad Hamza Kirmani, Troy, MI (US); Bradley Allen Newcomb, Troy, MI (US); Xiaosong Huang, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 279 days.

(21) Appl. No.: 18/319,215

(22) Filed: May 17, 2023

(65) Prior Publication Data

US 2024/0384444 A1 Nov. 21, 2024

(51) Int. Cl.
*B27N 1/02* (2006.01)
*B29B 7/00* (2006.01)
(Continued)

(52) U.S. Cl.
CPC ............. *D01G 13/00* (2013.01); *B29B 7/002* (2013.01); *B29B 7/005* (2013.01); *B29B 7/007* (2013.01);
(Continued)

(58) Field of Classification Search
CPC ......... B27N 1/02; B29C 48/15; B29C 48/154; B29C 48/16; D01B 1/14; D01B 5/00;
(Continued)

(56) References Cited

U.S. PATENT DOCUMENTS 3,800,019 A * 3/1974 Parsey .................... B29C 48/15
264/171.23
5,605,567 A * 2/1997 Lancaster ................ C08J 11/08
106/166.01
(Continued)

FOREIGN PATENT DOCUMENTS

DE 102016217048 A1 3/2018
EP 3162931 A1 * 5/2017 ............... D01D 5/04
(Continued)

OTHER PUBLICATIONS

Wikipedia: Viskosefaser, <https://de.wikipedia.org/wiki/Viskosefaser>, Oct. 16, 2024.
(Continued)

*Primary Examiner* — Leo B Tentoni

(57) ABSTRACT

A method for manufacturing at least one of fibers and yarn from natural fibers includes providing at least one of technical fibers, elementary fibers, meso fibrils, and micro fibrils. Greater than or equal to 80% of the at least one of the technical fibers, the elementary fibers, the meso fibrils, and the micro fibrils are short natural fibers having a length that is less than or equal to 12.7 mm. The method includes creating at least one of a dispersion, a gel, a solution, a paste, and a dough including the at least one of the technical fibers, the elementary fibers, the meso fibrils and the micro fibrils; and spinning filaments of the at least one of fibers and yarn using the at least one of the dispersion, the gel, the solution, the paste, and the dough.

20 Claims, 5 Drawing Sheets

(51) Int. Cl.
    *B29C 48/15* (2019.01)
    *B29C 48/154* (2019.01)
    *B29C 48/16* (2019.01)
    *B29C 70/02* (2006.01)
    *D01B 1/14* (2006.01)
    *D01B 5/00* (2006.01)
    *D01B 5/02* (2006.01)
    *D01D 1/02* (2006.01)
    *D01D 5/04* (2006.01)
    *D01D 5/06* (2006.01)
    *D01D 5/40* (2006.01)
    *D01F 1/10* (2006.01)
    *D01G 1/04* (2006.01)
    *D01G 9/00* (2006.01)
    *D01G 13/00* (2006.01)
    *D01H 1/14* (2006.01)
    *D01H 3/02* (2006.01)
    *D01D 5/08* (2006.01)

(52) U.S. Cl.
    CPC ............. B29C 70/021 (2013.01); D01B 5/02 (2013.01); D01H 1/14 (2013.01); D01H 3/02 (2013.01); *D01D 5/08* (2013.01); *D10B 2401/063* (2013.01)

(58) Field of Classification Search
    CPC .. D01D 1/02; D01D 5/04; D01D 5/06; D01D 5/40; D01F 1/10; D01G 1/04; D01G 9/00; D01G 13/00
    USPC ......... 264/103, 140, 171.13, 171.23, 171.24, 264/171.25, 178 F, 203, 204, 207, 349, 264/442; 19/5, 6, 145.5
    See application file for complete search history.

(56) References Cited

U.S. PATENT DOCUMENTS

2010/0288456 A1   11/2010   Westland et al.
2011/0274908 A1*  11/2011   Kowata .................... C08J 5/045
                                                             264/442 X
2021/0054548 A1*   2/2021   Salam ..................... C08L 1/286

FOREIGN PATENT DOCUMENTS

EP              3162931 B1     7/2023
WO     WO-2016174306 A1   11/2016

OTHER PUBLICATIONS

German Office Action from counterpart DE1020231274996, dated Dec. 2, 2024.
U.S. Appl. No. 17/960,232, filed Oct. 5, 2022, Newcomb.
U.S. Appl. No. 17/989,172, filed Nov. 17, 2022, Newcomb.
Moud, Aref Abbasi. "Chiral Liquid Crystalline Properties of Cellulose Nanocrystals: Fundamentals and Applications". ACS Omega 2002 7 (35), 30673-30699. DOI: 10.1021/acsomega.2c03311. 27 Pages.

\* cited by examiner

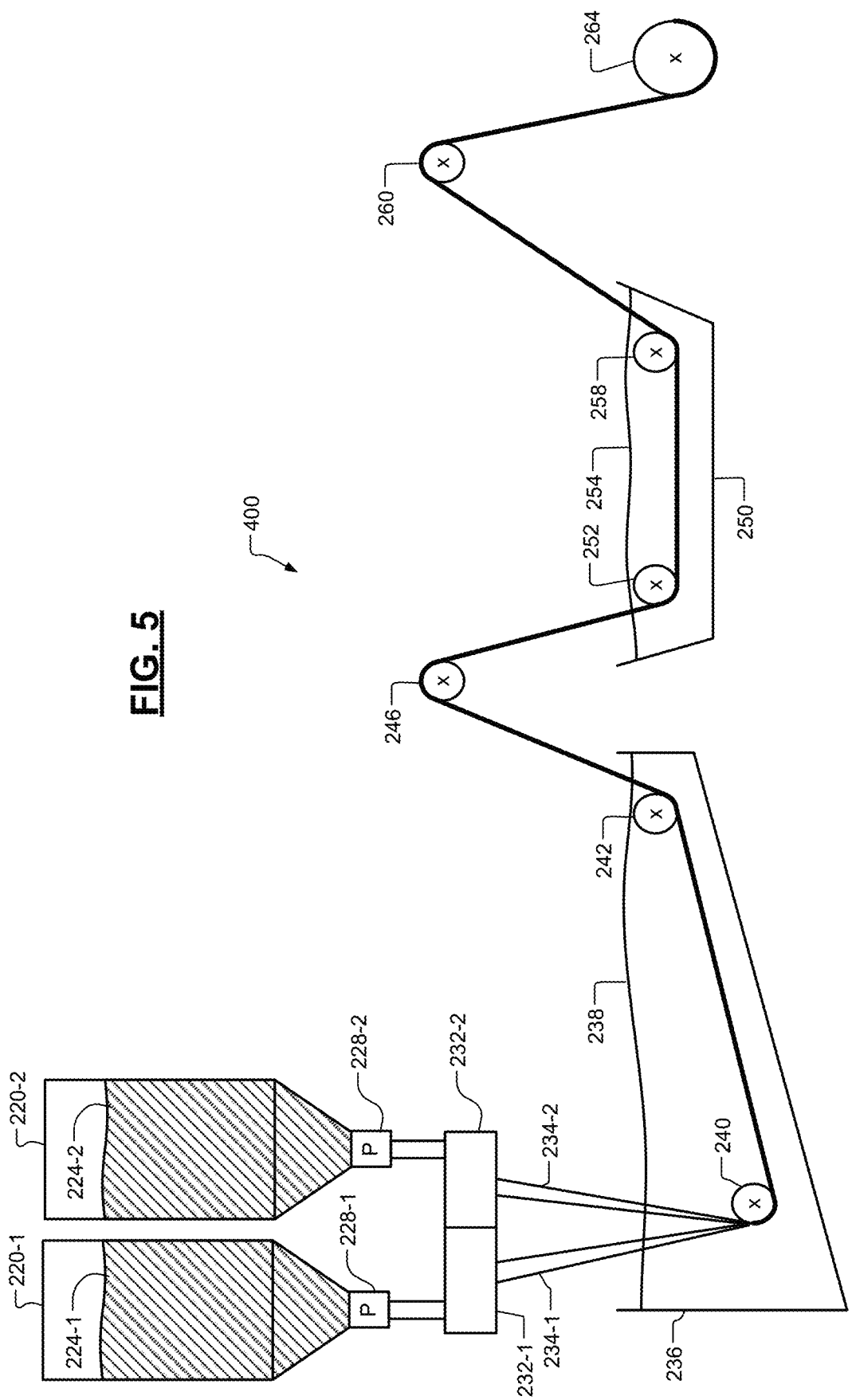

CONTINUOUS AND DISCONTINUOUS FIBERS, YARN, FABRICS AND COMPOSITES USING SHORT NATURAL FIBERS AND FIBRILS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to continuous and discontinuous fibers, yarns, fabrics, and composites made using short natural fibers and fibrils.

Natural fibers include bast, leaf, seed, wood, and grass stem. To increase sustainability and renewability, natural fibers may be used instead of other types of reinforcing fibers such as carbon fibers or glass fibers when manufacturing structural and semi-structural composite components.

SUMMARY

A method for manufacturing at least one of fibers and yarn from natural fibers includes providing at least one of technical fibers, elementary fibers, meso fibrils, and micro fibrils. Greater than or equal to 80% of the at least one of the technical fibers, the elementary fibers, the meso fibrils, and the micro fibrils are short natural fibers having a length that is less than or equal to 12.7 mm. The method includes creating at least one of a dispersion, a gel, a solution, a paste, and a dough including the at least one of the technical fibers, the elementary fibers, the meso fibrils and the micro fibrils; and spinning filaments of the at least one of fibers and yarn using the at least one of the dispersion, the gel, the solution, the paste, and the dough.

In other features, the method includes extruding the at least one of the dispersion, the gel, the solution, the paste, and the dough through a spinneret. The method includes providing the at least one of the technical fibers, the elementary fibers, the meso fibrils, and the micro fibrils includes using at least one process selected from a group consisting of heckling, mechanical griding, blending, chopping, and combinations thereof. The at least one of the dispersion, the solution, and the paste has a concentration of fibers in a range from 0.01 mg/ml to 100 mg/ml.

In other features, the method includes preparing the solution using at least one process selected from a group consisting of mixing, sonication, homogenizing, and combinations thereof. The method includes mixing the at least one of the technical fibers, the elementary fibers, the meso fibrils, and the micro fibrils with a solvent to create the at least one of the gel and the dough. The method includes adding a binder to the at least one of the technical fibers, the elementary fibers, the meso fibrils and the micro fibrils and the solvent to enhance crosslinking in the at least one of the gel and the dough.

In other features, the at least one of fibers and yarn comprises continuous reinforcing fibers. The at least one of fibers and yarn comprises discontinuous reinforcing fibers. The at least one of the technical fibers, the elementary fibers, the meso fibrils, and the micro fibrils further include long natural fibers having a length greater than 12.7 mm. The short natural fibers comprise greater than or equal to 90% of the at least one of the technical fibers, the elementary fibers, the meso fibrils, and the micro fibrils. The at least one of fibers and yarn has a tensile modulus in a range from 5 GPa to 140 GPa.

In other features, the method includes comingling the at least one of fibers and yarn with at least one of polymer fibers, carbon fibers, glass fibers, and ceramic fibers. The method includes creating a composite component by mixing the at least one of fibers and yarn with a resin. The method includes at least one of thermoforming and compressing molding the composite component.

A method for manufacturing composite component includes providing at least one of technical fibers, elementary fibers, meso fibrils, and micro fibrils. Greater than or equal to 80% of the at least one of the technical fibers, the elementary fibers, the meso fibrils, and the micro fibrils are short natural fibers having a length that is less than or equal to 12.7 mm. The method includes creating at least one of a dispersion, a gel, a solution, a paste, and a dough including the at least one of the technical fibers, the elementary fibers, the meso fibrils, and the micro fibrils; spinning filaments from the at least one of the dispersion, the gel, the solution, the paste, and the dough using a spinneret; combining a plurality of the filaments into a continuous reinforcing fiber; and creating the composite component by encapsulating the continuous reinforcing fiber in a resin.

In other features, the short natural fibers comprise greater than or equal to 90% of the at least one of the technical fibers, the elementary fibers, the meso fibrils, and the micro fibrils. The continuous reinforcing fiber has a tensile modulus in a range from 5 GPa to 140 GPa. The at least one of the technical fibers, the elementary fibers, the meso fibrils, and the micro fibrils further include long natural fibers having a length greater than 12.7 mm.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 5 illustrates an example of another method for fabricating reinforcing fibers using short natural fibers according to the present disclosure.

In the drawings, reference numbers may be reused to identify similar and/or identical elements.

DETAILED DESCRIPTION

While the present disclosure relates to methods for making fibers, yarns, and/or fabrics using short natural fibers for use in composites for vehicles, the reinforcing fibers, yarns and/or fabrics can be used in stationary applications or other types of applications.

Figure 1:
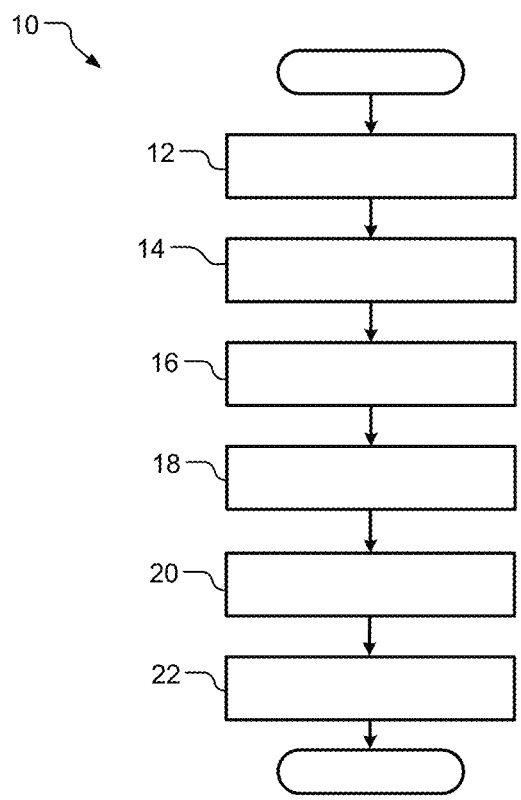
FIG. 1 is a flowchart illustrating an example of a dry spinning process that is optimized for long natural fibers.
Figure 2A:
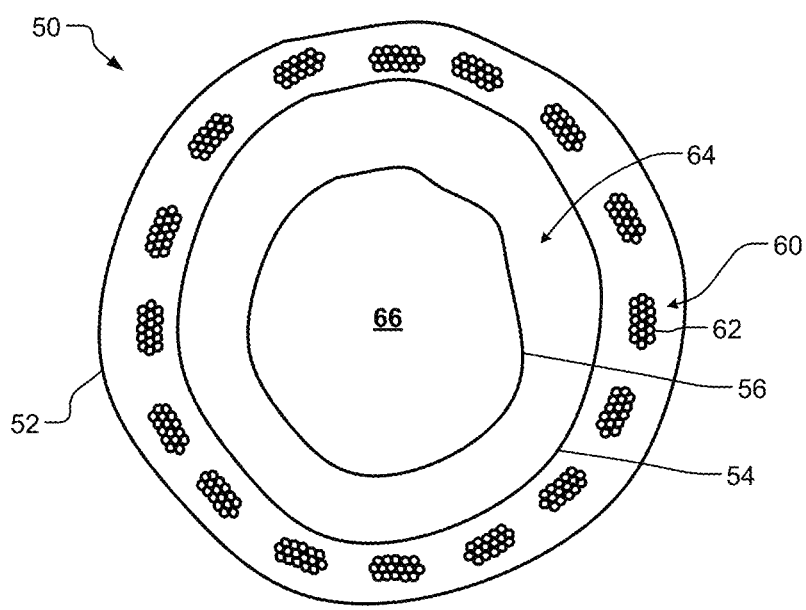
FIG. 2A is a cross sectional view of an example of a stem including natural fibers.
Figure 2B:
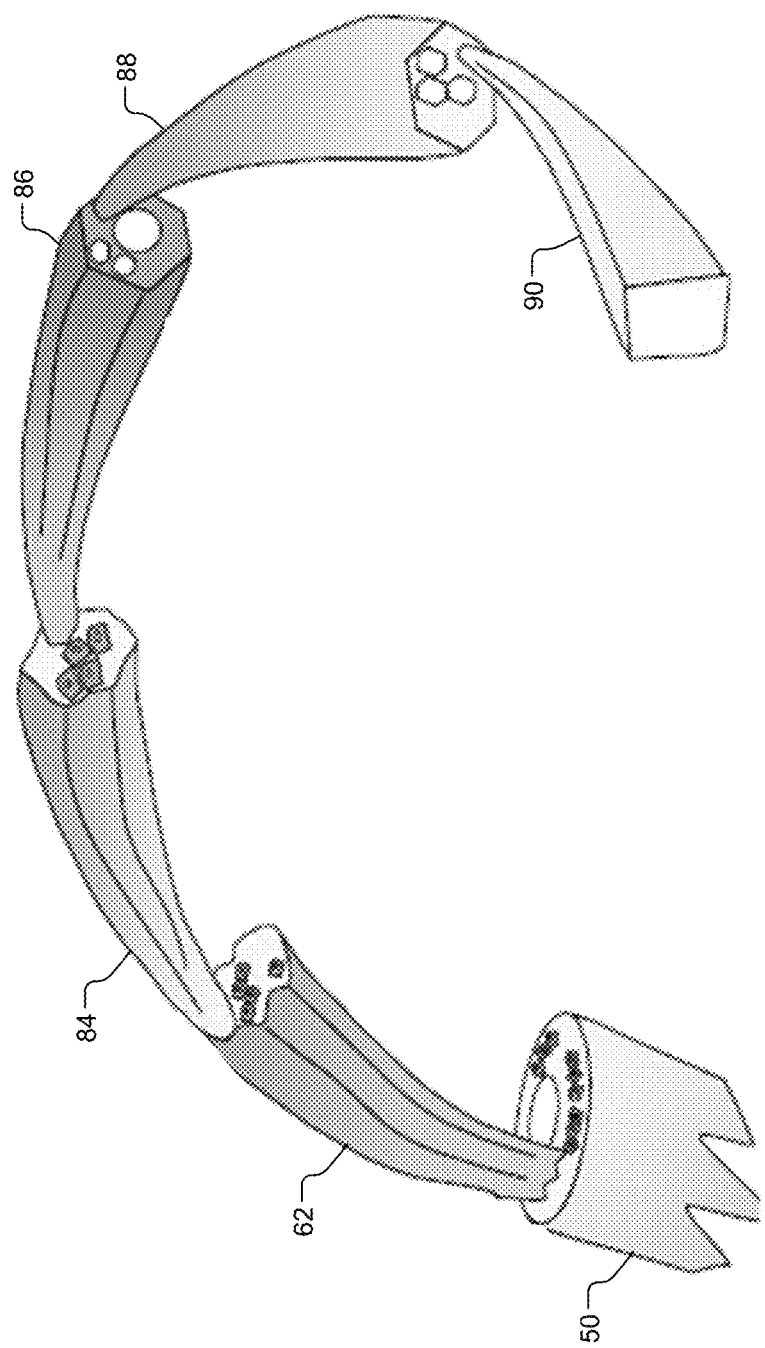
FIG. 2B illustrates components of the natural fiber including bundles, technical fibers, elementary fibers, meso fibrils, and micro fibrils.

In the description that follows, FIG. 1 shows a typical method for dry spinning continuous reinforcing fibers using long natural fibers. FIGS. 2A and 2B show the composition of a stem of a natural fiber. As used herein, long natural fibers refer to natural fibers having a longitudinal length that is greater than 12.7 mm and short natural fibers refer to natural fibers having a longitudinal length that is less than or equal to 12.7 mm.

Generally, the short natural fibers are not used in spinning and weaving processes for continuous reinforcing fibers. The short natural fibers are either discarded or used in making lower commercial value products such as non-woven fabrics having relatively low unidirectional properties and/or low fiber alignment as compared to continuous fibers and/or yarns made with long natural fibers.

As will be described further below, the present disclosure relates to short natural fibers that are extracted from cultivated crops and/or recovered from post-industrial or post-consumer sources. The short natural fibers are processed using a wet spinning process (e.g., extruded through a spinneret) to make continuous and/or discontinuous fibers and yarns with improved mechanical properties.

In some examples, the reinforcing fibers are made using both short and long natural fibers that are commingled. In some examples, the short natural fibers comprise greater than or equal to 80% and the long natural fibers comprise less than or equal to 20% by volume or weight of the fibers that are used in the solution or gel spinning process. In other examples, the short natural fibers comprise greater than or equal to 90% and the long natural fibers comprise less than or equal to 10% by volume or weight of the fibers that are used in the solution or gel spinning process. In some examples, only short natural fibers are used. In some examples, the short and/or long natural fibers may include cellulose, pectin, waxes, and/or lignin.

Referring now to FIG. 1, a flowchart for a method 10 for dry spinning continuous reinforcing fibers using long natural fibers is shown. At 12, plants are cultivated. Seeds are planted and stalks grow. When the plants reach a height of 3' to 4' after a few months, the plant is harvested. At 14, retting is performed. Retting involves decomposition of woody matter enclosing the fibers. At 16, scutching/breaking is performed. When the decomposed woody tissue dries, the fibers are fed through rollers of a roller system and crushed. The scutching/breaking process separates the woody matter from the fibers. At 18, combing/heckling is performed to separate coarse fiber bundles from finer bundles and to arrange the fibers generally parallel to one another.

In some examples, the long natural fibers are spun into filaments, fibers, and/or yarn at 20. The filaments, fibers, and/or yarn can be used as a reinforcing fiber in a composite. Alternately, the filaments, fibers, and/or yarn can be woven into cloth at 22. However, the dry spinning process is not suitable for short natural fibers.

Referring now to FIGS. 2A and 2B, constituents of natural fibers are shown. In FIG. 2A, the natural fiber 50 includes an epidermis or outer layer 52, a middle layer 54, and an inner layer 56. A plurality of fiber cells 60 including a fiber bundles 62 are arranged between the outer layer 52 and the middle layer 54. A woody body or shive 64 is arranged between the middle layer 54 and the inner layer 56. A hollow space 66 is located inside of the inner layer 56.

In FIG. 2B, the stem including natural fibers 50 typically has a diameter in a range from 2 to 3 mm. After breaking and scutching to produce the fiber bundles 62, hacking is performed to produce technical fibers 84 having a diameter in a range from 50 to 100 μm. The technical fibers 84 can be further processed to provide elementary fibers 86 having a diameter in a range from 10 μm to 20 μm, meso fibrils 88 having a diameter in a range from 0.1 μm to 0.3 μm, and microfibrils 90 having a diameter in a range from 1 to 4 nm.

Reinforcing fiber, yarn, or fabric is made using aligned short renewable technical fibers, elementary fibers, meso fibrils, micro fibrils, and/or combinations thereof. In some examples, the technical fibers, elementary fibers, meso fibrils, and/or micro fibrils are prepared using one or more of the following processes: heckling, mechanical grinding, blending, chopping and/or combinations thereof.

In some examples, the reinforcing fibers including aligned short renewable technical fibers, elementary fibers, meso fibrils, micro fibrils, and/or combinations thereof are mixed with one or more polymers or copolymers. In some examples, dispersions, solutions, and/or pastes are made using renewable technical fibers, elementary fibers, meso fibrils, and/or micro fibrils that are mixed with one or more solvents. In some examples, a fiber concentration of the solution is in a range from 0.01 mg/ml to 100 mg/ml. In some examples, the solution is created using at least one of mechanical mixing, shear mixing, sonication, homogenizing, and/or combinations thereof.

In some examples, gels or doughs are prepared using the short technical fibers, the elementary fibers, the meso fibrils, and/or the micro fibrils and one or more solvents. In some examples, the gels are prepared by enhancing interactions and physical cross-linking between the technical fibers, the elementary fibers, the meso fibrils, and/or the micro fibrils and the solvent in the dispersions, the solutions or the paste. In some examples, the interactions between the natural fiber precursors and the solvent are enhanced by increasing the solvent concentration and/or adding binders that physically or chemically crosslink the precursor materials in the solution.

In some examples, the gels are prepared via electrophoretic deposition of the technical fibers, elementary fibers, meso fibrils, and/or micro fibrils dispersed in solutions.

In some examples, the reinforcing fibers are continuous or discontinuous reinforcing fibers. In some examples, the dispersion, the solution, the paste, the gel and/or the dough are extruded through a spinneret and formed into a continuous or discontinuous fiber or yarn via drying or coagulation or both. During extrusion of the mixture through the holes in the spinneret, the short fibers tend to align in a longitudinal direction of the filaments.

In some examples, the reinforcing fiber or yarn has a tensile modulus in a range from 5 to 140 GPa. In some examples, woven and/or non-woven fabrics incorporate the reinforcing fibers or yarns. In some examples, commingled fibers, yarns or fabrics include the reinforcing fibers and other fibers made of one or more materials selected from a group consisting of polymer fibers, carbon fibers, glass fibers, and/or ceramic fibers. In some examples, composite components such as parts or panels incorporate the fabric.

In some examples, fiber reinforced composites are manufactured using thermoforming or compression molding using the reinforcing fibers.

Figure 3:
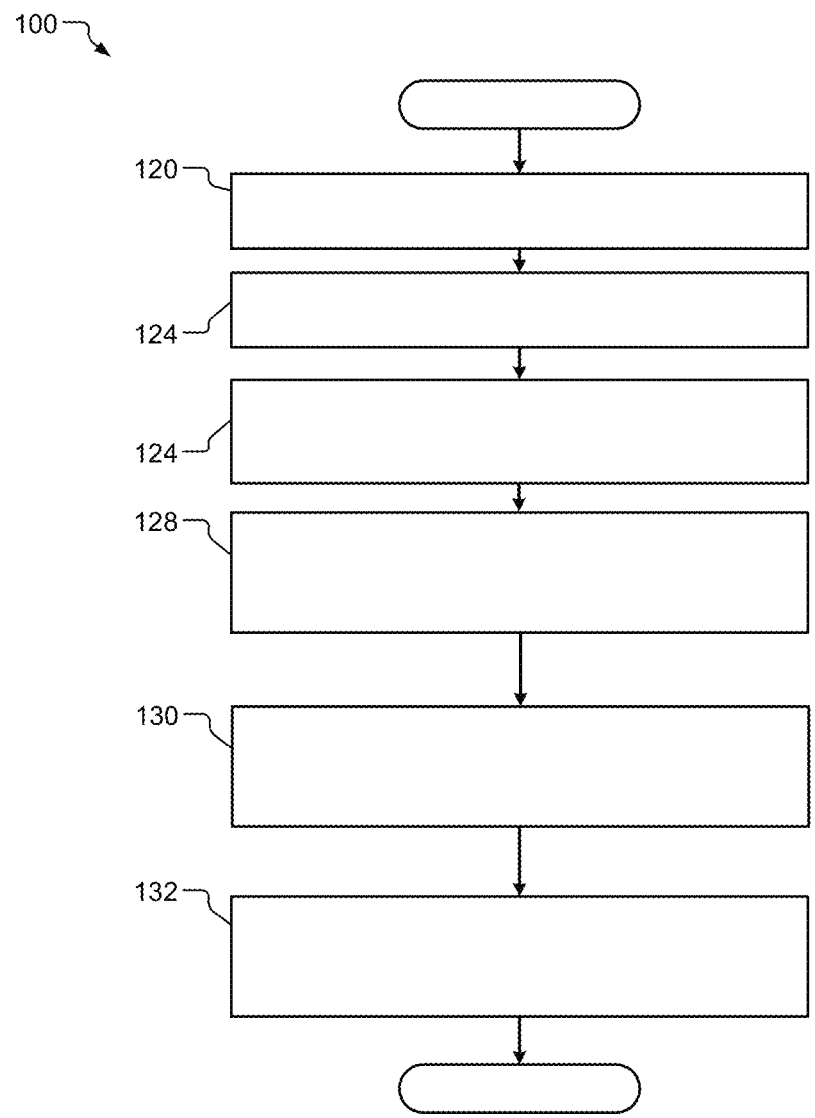
FIG. 3 is a flowchart of an example of a method for wet spinning fiber and yarns using short natural fibers according to the present disclosure.

Referring now to FIG. 3, a method 100 is shown for fabricating reinforcing fibers using short natural fibers (and optionally some long natural fibers). At 120, natural fibers are broken down into short natural fibers and long natural fibers. At 124, the short natural fibers and long natural fibers are separated. In other examples, the short natural fibers are recovered from post-industrial or post-consumer sources. In some examples, further processing of the short natural fibers and/or long natural fibers is performed.

At 128, a dispersion, a solution, a paste, a gel, and/or a dough is made using the short natural fibers. At 130, one or more of the dispersion, the solution, the paste, the gel, and/or the dough is optionally mixed into one or more predetermined mixtures. At 132, fiber and/or yarn is spun using the dispersion, the solution, the paste, the gel, and/or the dough and/or the one or more predetermined mixtures.

Figure 4:
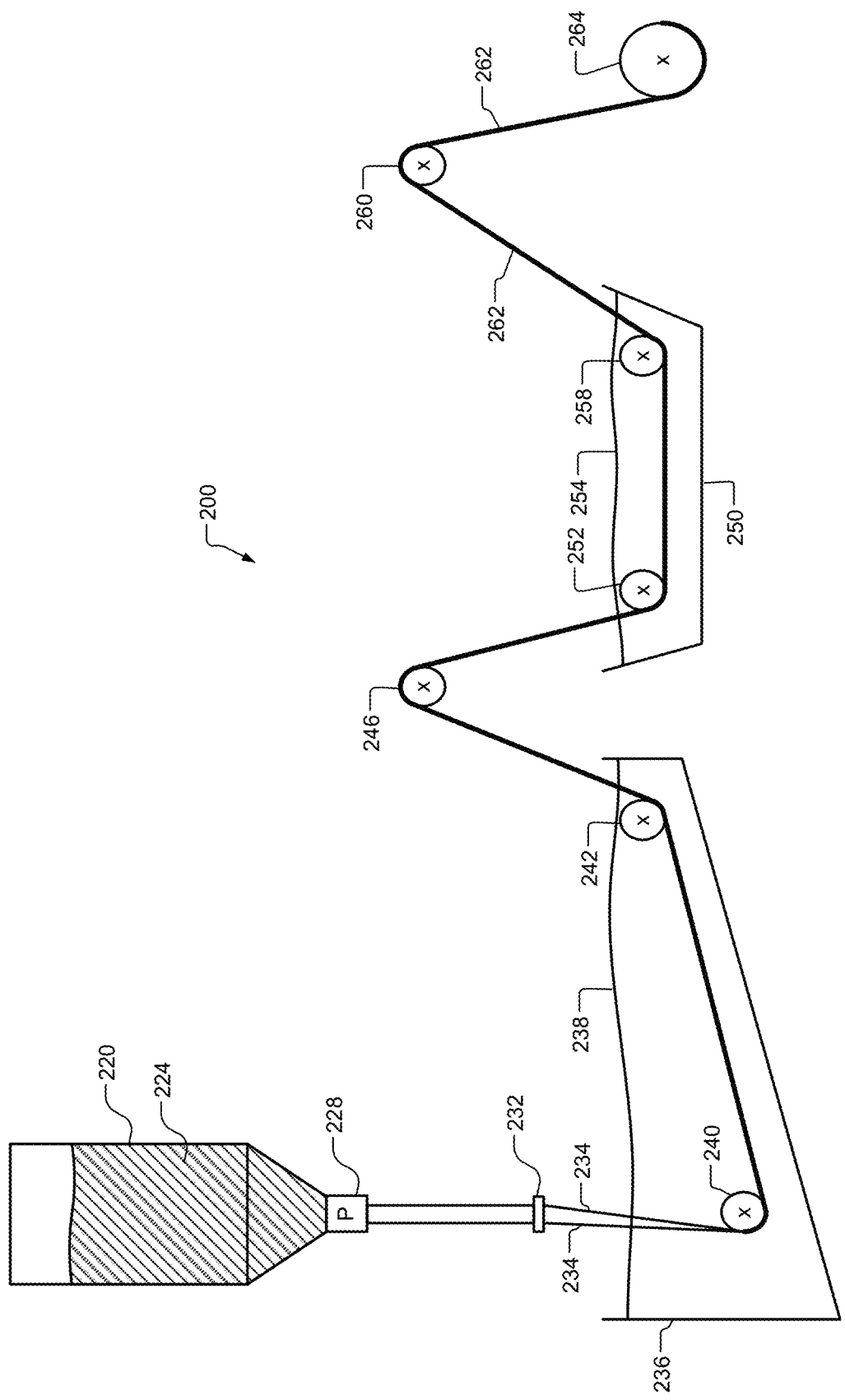
FIG. 4 illustrates an example of a method for making filaments and/or reinforcing fibers using short natural fibers according to the present disclosure.

Referring now to FIG. 4, an example of a spinning system 200 for extruding continuous and/or discontinuous fiber or yarn is shown. A mixture 224 is supplied by a container 220 to a pump 228. The mixture 224 includes the dispersions, solutions, pastes, gels, and/or doughs that include the short natural fibers and/or the short natural fibers and some long natural fibers.

The pump 228 outputs the mixture 224 to a spinneret 232. The spinneret 232 is a device used to extrude a solution or melt including a mixture of the short natural fibers to form fiber filaments. Streams of viscous mixture with the short natural fibers and optionally some long natural fibers exit the spinneret 232 into air or liquid leading to a phase inversion which allows the fiber filaments to solidify. The individual short natural fibers tend to align in a longitudinal direction of the filament as they are extruded through the spinneret.

The spinneret 232 generally includes a thimble-shaped, metal nozzle having fine holes through which the mixture is forced to form a filament. The fiber filaments are solidified by coagulation, evaporation, and/or cooling. The size and shape of the holes in the spinneret 232 determine a cross-sectional shape of the filaments. Each hole forms a filament.

In some examples, the spinneret 232 may be supplied a single mixture. In other examples, the spinneret 232 includes separate chambers that are supplied with two or more mixtures and feed separate sets of holes with different arrangements to provide different fiber regions with the fiber.

In some examples, the spinneret 232 defines an air gap between an end of the spinneret 232 and a surface of liquid 238 in a bath 236. Solvent in the one or more fibers 234 is removed by the liquid 238 in the bath 236. For example, the fiber 234 may pass over rollers 240 and 242 in the bath 236. Additional washing, drying, and/or stretching steps may occur during fiber formation. For example, the fiber 234 may pass over a roller 246 and into a washing bath 250 including a liquid 254. In some examples, the fiber passes over rollers 252 and 258 in the liquid 254 to wash the fiber 234. Fibers 262 that are washed pass over a roller 260 and are collected onto a roll 264.

While a dry jet wet spinning process is shown in FIG. 4 (with an air gap between the spinneret and the bath), other gel or solution spinning processes can be used. For example, wet spinning can be used where an outlet of the spinneret is immersed in the bath. In other examples, a polymer solution can be used (e.g., without a bath). The polymer solution is extruded by the spinneret and hot air is directed at the filaments exiting the spinneret before the filaments are wound on a roll.

In other examples, melt spinning of a polymer melt can be used (e.g., without a bath). The spinneret extrudes the polymer melt to produce filaments from the polymer melt. Quench air is directed at the filaments exiting the spinneret before the filaments are wound on a roll. In other examples, electrospinning of a polymer solution can be used (e.g., without a bath). A polymer solution is used and a high voltage is applied to the spinneret and a collector plate. The filaments exiting the spinneret complete the circuit.

Referring now to FIG. 5, another system 400 for extruding fibers is shown. Two or more fibers (at least one that is spun from the short natural fibers as described above) can be interwound. Mixtures 224-1 and 224-2 are supplied by containers 220-1 and 220-2 to pumps 228-1 and 228-2, respectively. The pump 228-1 outputs one or more aqueous suspensions of a fiber 234-1 of the mixture 224-1 to a spinneret 232-1. The pump 228-2 outputs one or more aqueous suspensions of a fiber 234-2 of the mixture 224-2 to a spinneret 232-2. The spinneret 232-2 outputs fibers 234-2 that are interwound with the fibers 234-1.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A method for manufacturing at least one of fibers and yarn from bast fibers, comprising:
providing bast fibers including technical fibers with a diameter of 50 to 100 µm, elementary fibers with a diameter of 10 to 20 µm, meso fibrils with a diameter of 0.1 to 0.3 µm, and micro fibrils with a diameter of 1 to 4 nm, wherein greater than or equal to 80% of the technical fibers, the elementary fibers, the meso fibrils, and the micro fibrils are short bast fibers having a length that is less than or equal to 12.7 mm, and less than or equal to 20% of the technical fibers, the elemental fibers, the meso fibrils and the micro fibrils are long bast fibers with a length of more than 12.7 mm;

creating at least one of a dispersion, a gel, a solution, a paste, and a dough including the technical fibers, the elementary fibers, the meso fibrils and the micro fibrils; and spinning filaments of the at least one of fibers and yarn using the at least one of the dispersion, the gel, the solution, the paste, and the dough.

2. The method of claim 1, further comprising extruding the at least one of the dispersion, the gel, the solution, the paste, and the dough through a spinneret.

3. The method of claim 1, wherein providing the bast fibers including the technical fibers, the elementary fibers, the meso fibrils, and the micro fibrils includes using at least one process selected from a group consisting of heckling, mechanical grinding, blending, chopping, and combinations thereof.

4. The method of claim 1, wherein the at least one of the dispersion, the solution, and the paste has a concentration of fibers in a range from 0.01 mg/ml to 100 mg/ml.

5. The method of claim 1, further comprising preparing the solution using at least one process selected from a group consisting of mixing, sonication, homogenizing, and combinations thereof.

6. The method of claim 1, further comprising mixing the technical fibers, the elementary fibers, the meso fibrils, and the micro fibrils with a solvent to create the at least one of the gel and the dough.

7. The method of claim 6, further comprising adding a binder to the technical fibers, the elementary fibers, the meso fibrils and the micro fibrils and the solvent to enhance crosslinking in the at least one of the gel and the dough.

8. The method of claim 1, wherein the at least one of fibers and yarn comprises continuous reinforcing fibers.

9. The method of claim 1, wherein the at least one of fibers and yarn comprises discontinuous reinforcing fibers.

10. The method of claim 1, wherein the short bast fibers comprise greater than or equal to 90% of the technical fibers, the elementary fibers, the meso fibrils, and the micro fibrils.

11. The method of claim 1, wherein the at least one of fibers and yarn has a tensile modulus in a range from 5 GPa to 140 GPa.

12. The method of claim 1, further comprising comingling the at least one of fibers and yarn with at least one of polymer fibers, carbon fibers, glass fibers, and ceramic fibers.

13. The method of claim 1, further comprising creating a composite component by mixing the at least one of fibers and yarn with a resin.

14. The method of claim 13, further comprising at least one of thermoforming and compressing molding the composite component.

15. A method for manufacturing a composite component comprising:

providing bast fibers including technical fibers with a diameter of 50 to 100 μm, elementary fibers with a diameter of 10 to 20 μm, meso fibrils with a diameter of 0.1 to 0.3 μm, and micro fibrils with a diameter of 1 to 4 nm, wherein greater than or equal to 80% of the technical fibers, the elementary fibers, the meso fibrils, and the micro fibrils are short bast fibers having a length that is less than or equal to 12.7 mm, and less than or equal to 20% of the technical fibers, the elemental fibers, the meso fibrils and the micro fibrils are long bast fibers with a length of more than 12.7 mm;

creating at least one of a dispersion, a gel, a solution, a paste, and a dough including the technical fibers, the elementary fibers, the meso fibrils, and the micro fibrils;

spinning filaments from the at least one of the dispersion, the gel, the solution, the paste, and the dough using a spinneret;

combining a plurality of the filaments into a continuous reinforcing fiber; and creating the composite component by encapsulating the continuous reinforcing fiber in a resin.

16. The method of claim 15, wherein the short bast fibers comprise greater than or equal to 90% of the technical fibers, the elementary fibers, the meso fibrils, and the micro fibrils.

17. The method of claim 15, wherein the continuous reinforcing fiber has a tensile modulus in a range from 5 GPa to 140 GPa.

18. The method of claim 15, further comprising mixing the technical fibers, the elementary fibers, the meso fibrils, and the micro fibrils with a solvent to create the at least one of the gel and the dough.

19. The method of claim 18, further comprising adding a binder to the technical fibers, the elementary fibers, the meso fibrils and the micro fibrils and the solvent to enhance crosslinking in the at least one of the gel and the dough.

20. The method of claim 15, further comprising at least one of thermoforming and compressing molding the composite component.

* * * * *